US008459434B2

(12) United States Patent
Horniak et al.

(10) Patent No.: US 8,459,434 B2
(45) Date of Patent: Jun. 11, 2013

(54) ARTICLE RECEIVING AND DETECTION APPARATUS AND METHOD THEREFORE

(75) Inventors: John Colin Horniak, Warrington, PA (US); Stephen Horniak, Sr., Doylestown, PA (US); Robert A. Di Domizio, Jr., Hatfield, PA (US)

(73) Assignee: Deltronic Labs, Inc., Chalfont, PA (US)

( * ) Notice: Subject to any disclaimer, the term of this patent is extended or adjusted under 35 U.S.C. 154(b) by 227 days.

(21) Appl. No.: 12/727,107

(22) Filed: Mar. 18, 2010

(65) Prior Publication Data

US 2010/0263982 A1 Oct. 21, 2010

Related U.S. Application Data

(60) Provisional application No. 61/161,363, filed on Mar. 18, 2009, provisional application No. 61/260,459, filed on Nov. 12, 2009.

(51) Int. Cl.
*B65G 47/56* (2006.01)

(52) U.S. Cl.
USPC .......................................... 193/31 R; 194/205

(58) Field of Classification Search
None
See application file for complete search history.

(56) References Cited

U.S. PATENT DOCUMENTS

| | | | | |
|---|---|---|---|---|
| 4,784,251 | A * | 11/1988 | DeWoolfson et al. | 194/209 |
| 2007/0012541 | A1 * | 1/2007 | Boydston et al. | 194/205 |
| 2008/0156612 | A1 * | 7/2008 | Jimenez et al. | 194/205 |

* cited by examiner

*Primary Examiner* — Kavel Singh
(74) *Attorney, Agent, or Firm* — Fox Rothschild LLP

(57) ABSTRACT

An apparatus for receiving and detecting an article having a chute configured for receiving the article therein, a stop having a stop member disposed within the chute and biased towards the article to allow the stop member to engage the article moving through the chute but which prevents the article from being withdrawn from the chute, a receipt dispenser for issuing a physical receipt indicating that an article has been received by the apparatus, and a lock mechanism operable by movement of the article in the chute so as to physically detect the presence of an article therein to prevent dispensing of a receipt when the article is not detected in the chute. A method for receiving and detecting an article is also provided.

12 Claims, 16 Drawing Sheets

ARTICLE RECEIVING AND DETECTION APPARATUS AND METHOD THEREFORE

CROSS REFERENCE TO RELATED APPLICATIONS

This application is a non-provisional application of U.S. Provisional Application No. 61/161,363 filed Mar. 18, 2009, and of U.S. Provisional Application No. 61/260,459 filed Nov. 12, 2009, both of which are hereby incorporated herein by reference in their entirety. U.S. patent application Ser. No. 12/348,259, filed on Jan. 2, 2009, is also incorporated herein by reference in its entirety.

FIELD OF THE INVENTION

The present invention relates to bottle collection and recycling, and more particularly to devices for sensing and securely storing returned bottles and other similar items.

BACKGROUND OF THE INVENTION

It is known to recycle items such as glass and plastic bottles. This helps conserve resources and energy. While the return of empty bottles was previously a mostly manual process, more automated methods of receiving empty bottles have been developed.

One such device for receiving empty water bottles is disclosed in U.S. Patent Publication US2007/0012541 A1, which is incorporated herein by reference. The device and method disclosed in the publication provides for a bottle collection bin that receives and securely stores numerous empty bottles until such time as the bin is emptied. The bin includes a receiving chute through which the bottles are moved from the exterior into the interior of the bin where the bottles are stored. The bin can include means for detecting the intake of a bottle, such as a sensor, and means for indicating that a bottle was received, such as by dispensing a receipt (e.g. a ticket or card), as proof that a bottle was returned. The receipt, for example, could be used to obtain a discount for the purchase of another full water bottle, or for the return of a deposit on the bottle.

In one known device, the means for sensing the return of the bottle is provided by an optical sensor placed near an outlet of the bottle receiving chute. The chute has an inlet through which the bottle is placed into the bin, and an outlet through which the bottle falls into the locked bin cage from where it can be removed only by an authorized person. As a bottle is pushed through the inlet of the bottle receiving chute towards the outlet, the bottle eventually exits from the outlet and falls into the cage, passing by the optical sensor that detects the bottle. Placement of the sensor near the outlet of the chute allows the sensor to detect bottles that have exited the chute and are falling into the cage. Since many such bins may be placed in areas that are not monitored, it is important to provide adequate security and sensing means so that only one receipt is dispensed for each empty bottle, regardless of attempts by users to fool the device into issuing additional receipts. Nevertheless, one concern with presently known systems is that users can tamper with the device by moving a bottle or other item through the chute and, rather then releasing the item, move the item back and forth across the sensor to obtain unauthorized tickets or receipts. Another major concern is the possibility of false sensor detections. For example, it has been found that lightning, birds flying near a sensor, or even objects blown by the wind past a sensor can trigger false detection signals.

An improved device that overcomes many of the above problems is disclosed in U.S. patent application Ser. No. 12/348,259 owned by the present applicant. However, this device requires electrical power which is not always available depending on the location. Accordingly, an improved bottle receiving device that can securely receive bottles, is less prone to tampering and false signals, and which does not require electrical power would be advantageous.

SUMMARY OF THE INVENTION

The invention provides an improved article receiving device, such as a device for receiving bottles. In one form the invention provides an apparatus for receiving and detecting a bottle having a chute configured for receiving the bottle therein, which chute has a bottle inlet for receiving the bottle and a bottle outlet through which the bottle exits the chute. A bottle stop having a stop member is disposed within the chute and biased towards the bottle to allow the stop member to engage the bottle moving through the chute. The stop member is configured to be moved by the bottle in a direction away from the bottle as the bottle moves from the chute inlet to the outlet thereby allowing the bottle to pass. Furthermore, the stop member is biased to move in a direction towards the bottle as the bottle moves in a direction from the outlet to the inlet to more forcibly engage and thereby inhibit movement of the bottle. A receipt dispenser is mounted on the apparatus for issuing a physical receipt indicating that a bottle has been received by the apparatus. The receipt dispenser has a mechanical actuator positioned for engagement with the bottle passing through the chute, the dispenser being operable by the bottle engaging the actuator so as to cause the dispensing of a receipt. A lock mechanism is operable by movement of the bottle in the chute so as to physically detect the presence of a bottle therein, the lock mechanism being operatively connected to the receipt dispenser and movable by the bottle from a locked position preventing dispensing of a receipt when the bottle is not detected in the chute to an unlocked position allowing the dispensing of a receipt when the bottle is detected in the chute.

A method of receiving and detecting an article is also provided.

BRIEF DESCRIPTION OF THE DRAWINGS

The following detailed description will be better understood when read in conjunction with the figures appended hereto. For the purpose of illustrating the invention, there is shown in the drawings a preferred embodiment of the present invention. It is understood, however, that this invention is not limited to this embodiment or the precise arrangements shown.

DETAILED DESCRIPTION

Figure 1:
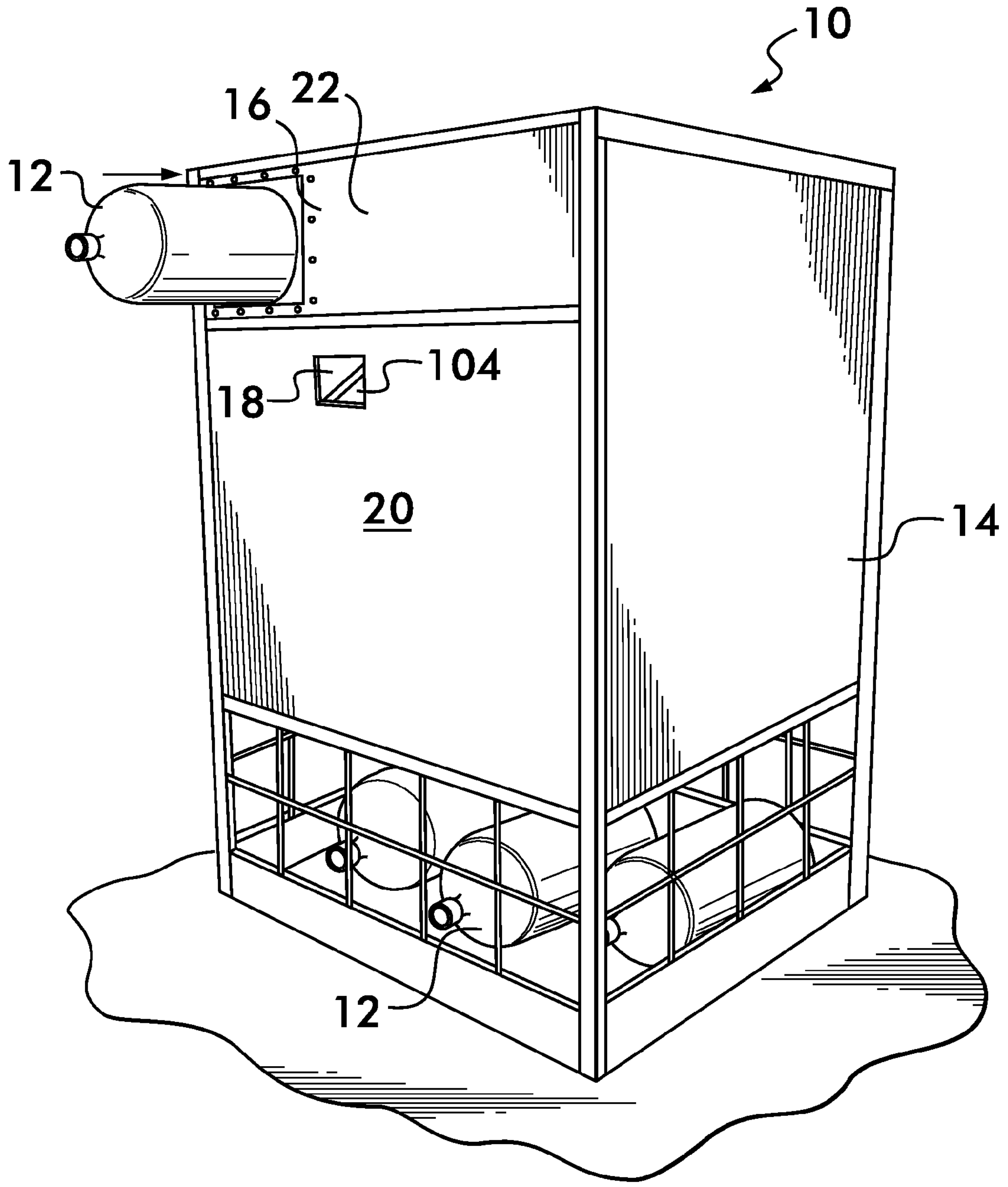
FIG. 1 is a perspective view of a bottle collection device in accordance with the present intention.

A preferred embodiment of the present invention is now described. With reference to FIG. 1, a bottle collection device 10 can securely receive and hold returned bottles 12, such as plastic water bottles as shown. The device 10 preferably includes a bin or cage like structure 14 as shown which can be locked securely to prevent unauthorized removal of the bottles 12, and a bottle receiving apparatus 16 which receives and detects the bottles. In the illustrated embodiment, an indicator 18 provides evidence that a bottle was received. The indicator 18 can include devices that dispense receipts, e.g., tickets and cards, as proof that a bottle was returned. Any type of bin or cage like structure that can securely hold the returned bottles can be used. The illustrated device 10 includes security bars and side panels as necessary to securely hold the bottles 12 within. A lockable access panel 20 allows removal of the returned bottles and access to the interior as needed. The device 10 is preferably constructed of tamper resistant materials such as steel. It will be appreciated that the present invention does not require electrical power, providing security and fraud protection without the need of electrical sensors.

Figure 2:
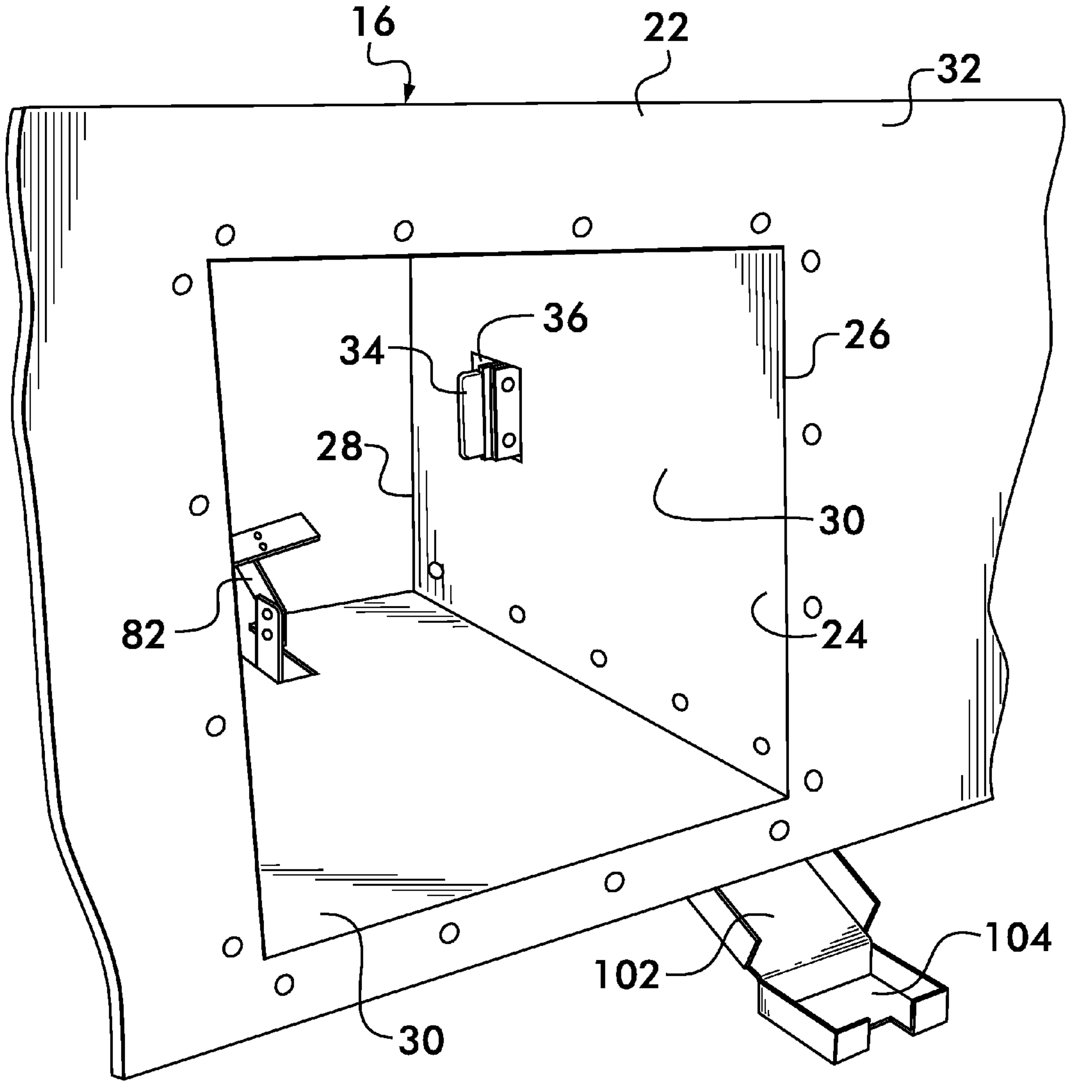
FIG. 2 is a front perspective view of a bottle return chute of a the present invention showing the chute inlet.
Figure 3:
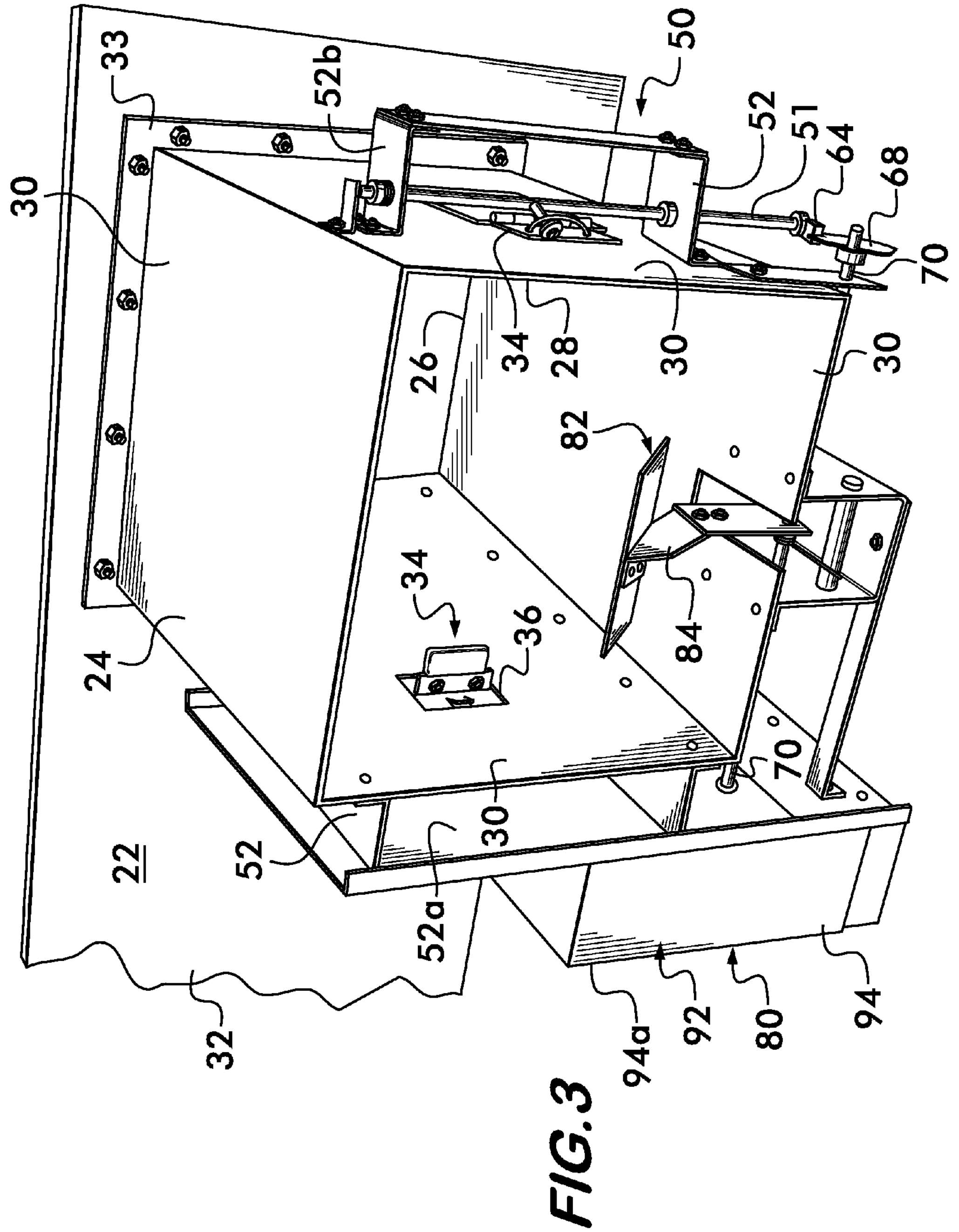
FIG. 3 is a rear perspective view of a bottle return chute of a the present invention showing the chute outlet.
Figure 4:
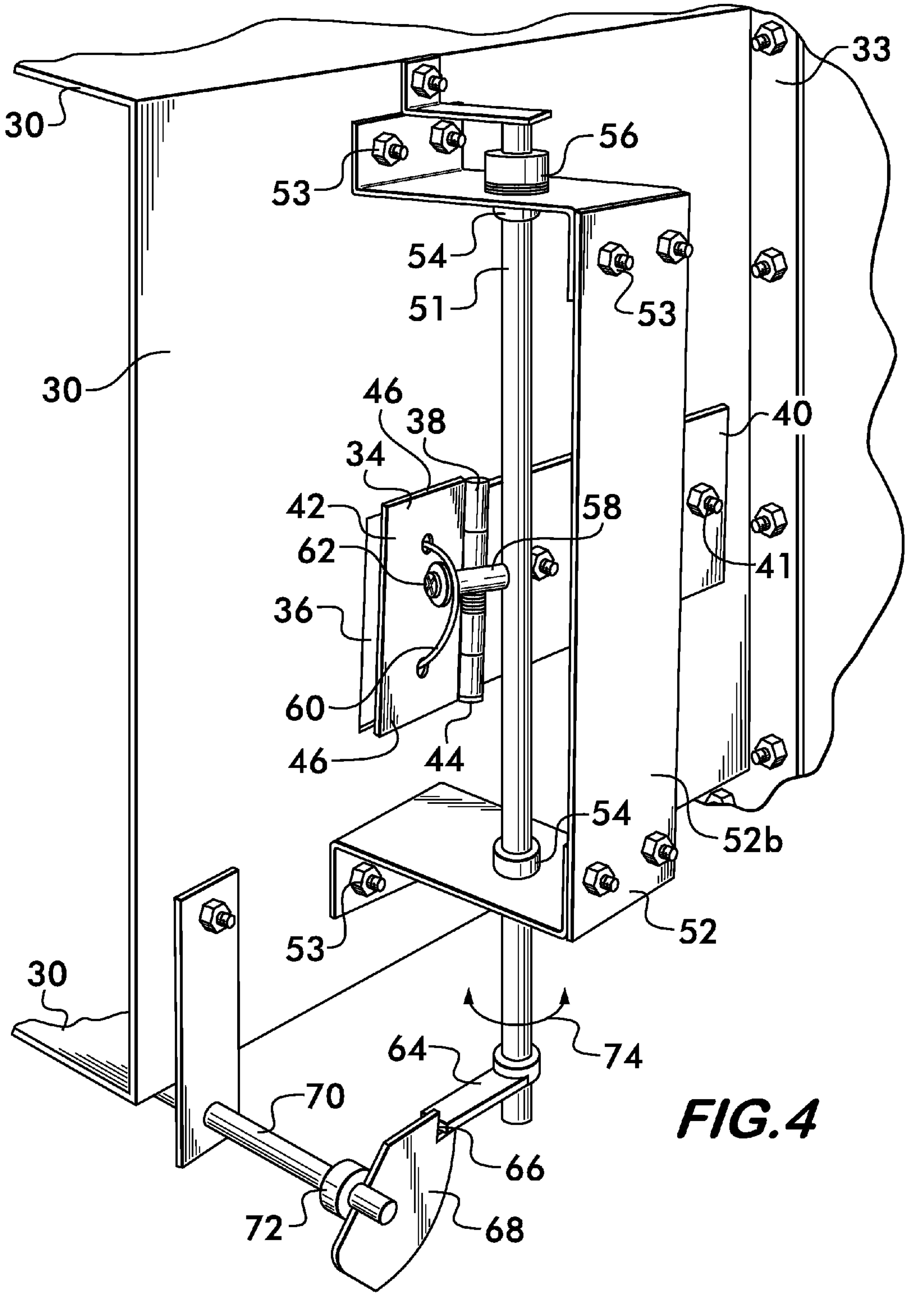
FIG. 4 is a side perspective view of the outside of the chute showing a locking mechanism.

With reference to FIGS. 2, 3 and 4, the illustrated bottle receiving apparatus 16 of the present invention is formed as a bottle return chute assembly 22 configured for use with 3 and 5 gallon plastic water bottles 12. The bottle return chute assembly 22 is shown removed from a top section of the collection device 10 as seen in FIG. 1, it being understood that the return chute assembly 22 can be fabricated separately from the remainder of the collection device 10 and attached in a suitable manner such as by welding or with fasteners such as bolts, rivets, etc. The bottle collection apparatus 10 receives the water bottles through the chute assembly 22, i.e., this apparatus allows a user to insert a water bottle through the chute assembly into the return apparatus 10 as illustrated in FIG. 1.

With reference to FIGS. 2, 3, 4 and 5, the bottle receiving chute assembly 22 includes a rectangular chute 24, preferably square as shown, having an inlet opening 26, an outlet opening 28, and chute walls 30 extending between the inlet and outlet openings. A front flat panel 32 is connected to the inlet side of the chute 24. The square chute 24 is connected to the front panel 32 by any suitable means such as by a front flange 33 bolted to the front panel 32 as shown in FIG. 3. The front panel 32 may have a round opening overlaying the square chute 24 behind it (not shown). Rectangular shaped chutes 24 are believed to be preferable for ease of attaching items such as brackets to the outside of the chute as square chutes 24 can be more consistently made. Cylindrically shaped chutes can be used but may not be consistent in shape (roundness) and thus brackets and other items to be attached may have to be modified for each individual unit.

With reference to FIG. 1, the bottle 12 is shown entering the inlet 26 while the outlet 28 is positioned within the bin 14 so that the bottles can fall securely into it. It is appreciated that the chute 24 is sized and configured for the particular objects to be received therein. It is contemplated that other chute shapes and non fully enclosed chutes may also be used, even for cylindrical bottles. In the present case, the chute is sized and configured to receive 3 and 5 gallon cylindrical plastic water bottles as known in the art. An example of a 5 gallon water bottle 12 is shown in FIG. 1. For example, a bottle 12 having an outer diameter of approximately 10.75 inches is believed to be suitable with a square chute 24 having inner dimensions of 11 inches by 11 inches by 15 inches length. This bottle 12 can have a carrying handle as is known in the art, although some bottles do not have handles. It is appreciated that the present invention is contemplated for use with different type bottles, including, but not limited to, propane tanks of the type used with home grills.

At least one bottle stop 34 is provided in an opening 36 formed in the chute walls 30. In the illustrated embodiment two such stops are provided on opposing sides of the chute walls 30, the two stops 34 being placed at the same position or length from the end of the chute 24.

Figure 5:
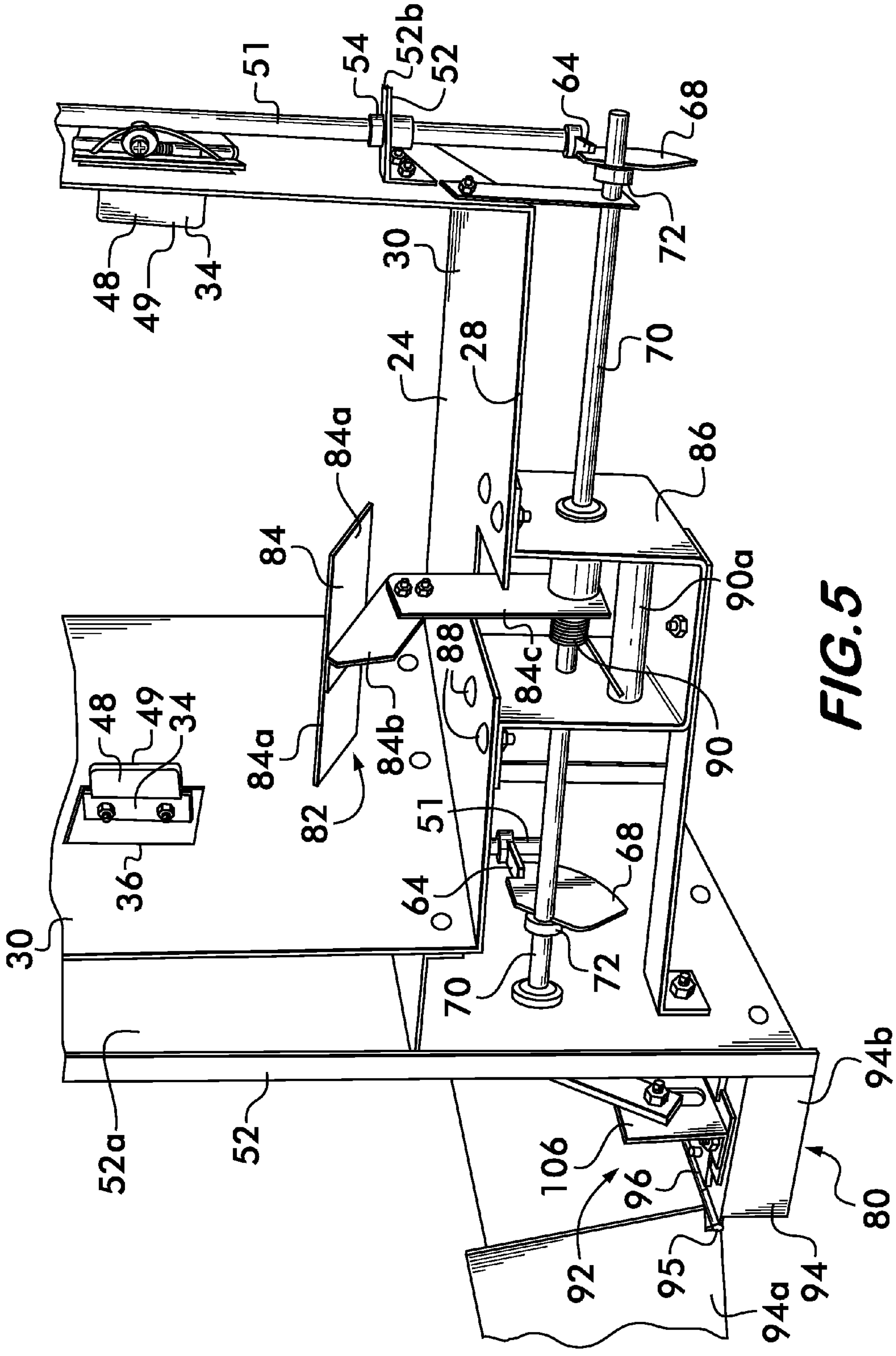
FIG. 5 is partial perspective view of the rear side of the chute.

With further reference to FIGS. 3, 4 and 5, each bottle stop 34 is pivotally attached to the chute wall 30 via a spring hinge 38. The hinge 38 includes a stationary section 40 fixedly attached via screws/bolts 41 or rivets to the chute wall 30, and a pivotal section 42 that pivots relative to the stationary section 40 about the hinge pin 44. The spring hinge 38 is configured to urge the pivotal section 42 towards the internal portion of the chute (leftward in FIG. 4) to engage a bottle 12 therein (FIG. 5). Stop flaps 46 extend beyond the opening 36 as shown, here above and below the opening 36, to engage the walls 30 and stop further movement of the pivotal section 42 into the chute 24.

As best seen with reference to FIGS. 4 and 5, each bottle stop 34 has a stop member 48 attached to and extending from the pivotal hinge section 42 through the opening 36 into the chute 24. The stop member 48 and pivotal section 42 are attached to one another by any suitable means such as bolts, one of the two members 42, 48 can be an angled piece of steel so that the two members 42, 48 are transverse to one another. The stop member 48 may include a rubber or polymeric sleeve 49 over a metal member 48 or any other type of material that can help grip the bottle 12, preferably with high friction. As discussed below, the two bottle stops 34 allow movement of the bottle 12 towards the chute outlet 28, while preventing or at least inhibiting the bottle 12 from being moved back towards the chute inlet 26. As a bottle 12 moves through the chute 24 from right to left in FIGS. 5 and 6 (left to right in FIG. 1), it is seen that the bottle 12 engages and pushes opposing stop members 48 so that they pivot away from the chute inlet 26 and towards the outlet 28 against the urging of the spring hinge 38 as the bottle slides past and against the stop members 48. Should the person inserting a bottle 12 attempt to pull or move the bottle back out of the chute (in a rightward direction towards the inlet 26), the stop members 48 will pivot into the bottle to grippingly engage the bottle and inhibit further movement of the bottle 12. It is appreciated that the harder one pulls on the bottle 12 trying to remove it from the inlet opening 26, the tighter the grip of the stop members 48 to more tightly clamp the bottle between the stop members 48. (It is appreciated that when discussing movement of the bottle 12 in a direction from the outlet towards the inlet, there may be very little actual movement of the bottle 12 in this direction, if any, due to the clamping action of the stops). Moving the bottle again towards the outlet opening 28 would again rotate stop members towards the outlet opening 28 to allow the bottle 12 to pass. The stops 34 and associated members can be made of any suitable material, such as metal for strength. As discussed, the stop member 48 can have a rubber or polymeric sleeve 49 over a metal member.

With reference to FIGS. 1 and 3, the device 10 includes a receipt dispenser 80 for dispensing a physical receipt through indicator slot 18 as evidence that a bottle 12 was received. As is further discussed below, the dispenser 80 can issue any suitable receipt, such as a paper ticket or plastic card. The dispenser 80 includes a mechanical actuator 82 operated by movement of the bottle 12 so as to cause the dispensing of a receipt. To prevent fraud, a lock mechanism 50 mounted on the device 10 is positioned to be operable by movement of the bottle 12 in the chute 24 so as to physically detect the presence of a bottle in the chute. The locking mechanism 50 is operatively connected to the receipt dispenser 80 as further discussed below to be movable by the bottle 12 from a position preventing dispensing of a receipt when the bottle 12 is not detected in the chute 24 to a position to allow the dispensing of a receipt when the bottle 12 is detected within the chute. The locking mechanism 50 and receipt dispenser 80 are now further described.

The locking mechanism 50 is now described with further reference to FIGS. 3, 4 and 5. The locking mechanism 50 includes lock bars 51, here formed as elongated shafts as shown, located on opposite sides of the chute 24, one such bar 51 being associated with each bottle stop 34, supported by brackets 52 attached with screws 53 to the outside of the chute walls 30 (the bracket 52*a* on the left side as seen in FIG. 5 is larger than the bracket 52*b* on the right since the one on the left 52*a* also acts as a support for other items as described below). Flanged oil impregnated bearings 54 allow the lock bars 51 to rotate relative to the brackets 52, and lock collars 56 hold the lock bars 51 in place. The lock bars 51 pivot back and forth responsively with movement of the bottle stops 34 associate therewith. As best seen in FIG. 4, a finger 58 connected to and extending from the lock bar 51 slidably engages the back side of the pivotal hinge section 42 and is held in engagement with the pivotal hinge section 42 by a plastic strap 60. A washer and screw head 62 at the end of the finger 58 prevents the strap 60 from slipping off of the finger 58. It is appreciated that the lock bar 51, via the spring hinge 38, is biased to be in the position as shown in FIG. 4 where the stop member 48 is in its inner most position within the chute 24, positioned to engage a passing bottle 12. Additional springs may be added to add further bias to the lock bar 51 as may be needed (e.g., on the top or bottom of the brackets 52 to act on lock bar 51 as is known in the art). As oriented in FIG. 4, it is seen that the lock bar 51 pivots counterclockwise (right arrow 74) as the bottle 12 moves through the chute 24 pushing the bottle stop 34 outwardly; and the lock bar 51 moves clockwise (left arrow 74) after the bottle 12 passes the stop member and the stop member 48 moves inwardly to return to its initial position. The lock bar 51 on the opposite wall 30 of the chute 24, which is not shown, moves in opposite directions.

Figure 6:
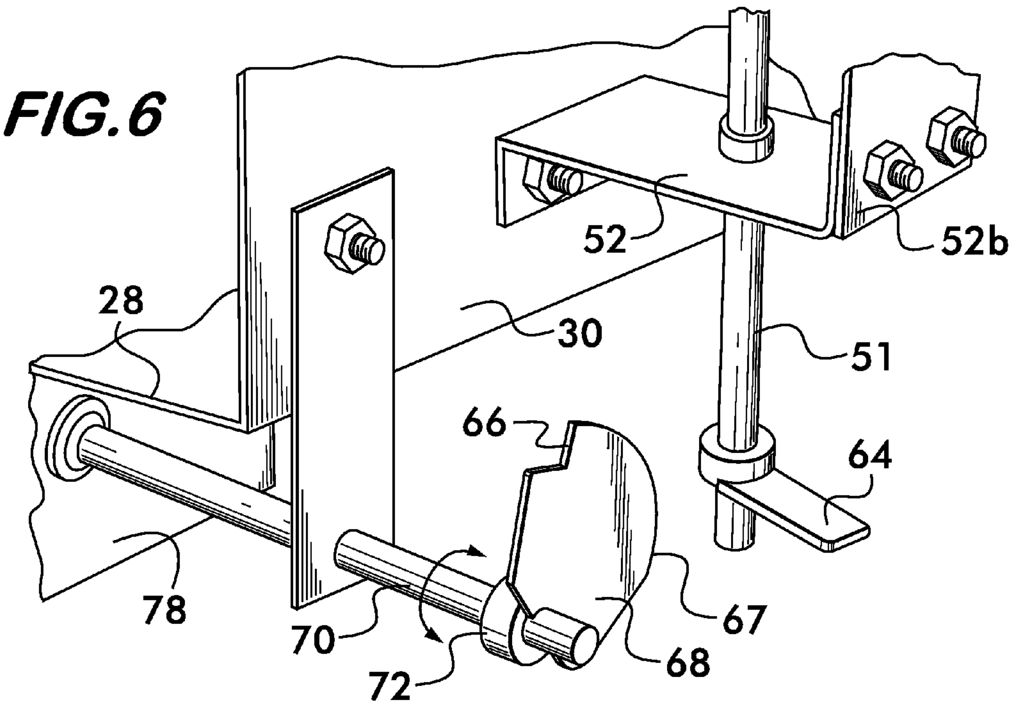
FIG. 6 is an enlarged partial side perspective view of the present invention showing the locking mechanism.
Figure 7:
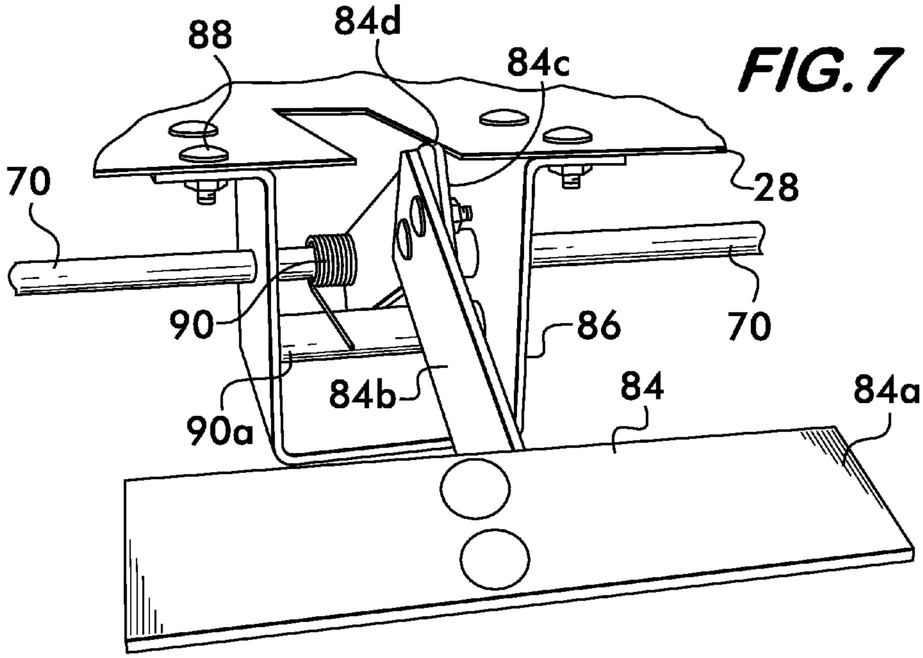
FIG. 7 is a rear perspective view of the bottle return chute showing the actuator.

With particular reference to FIGS. 4, 5 and 6, attached to each lock bar 51 for rotation therewith is a lock arm 64 which rotates in response to movement of the stop member 48. In the normal default position, when no bottle 12 is in the chute 24 and the stop member 48 is fully extended inwardly into the chute 24, the lock arm 64, engaging a slot 66 in a lock plate 68, prevents rotation of a dispenser shaft 70. The lock plate 68 is attached to the dispenser shaft by lock collar 72. As a bottle 12 is moved through the chute 24, the movement of stop member 48 causes the rotation of the lock bar 51 counterclockwise as indicated by arrow 74 in FIG. 4, which in turn rotates the lock arm 64 counterclockwise out of the slot 66 of the lock plate 68 to permit rotation of the dispenser shaft 70 as illustrated in FIG. 6.

As seen in FIG. 5, both lock plates 68 must be released in order for the dispenser shaft 70 to be able to rotate. As described below, the rotation of the dispenser shaft 70 causes a receipt card to be issued, and thus if the dispenser shaft 70 is locked to prevent rotation, a receipt cannot be released. After the bottle 12 passes through the chute 24, the stop members 48 move back to their initial position as urged by the spring hinge 38, thereby moving the lock bars 51 back to their initial positions which in turn move the lock arms 64 back into the slots 66 of lock plate 68 to lock the dispenser shaft 70. With reference to FIGS. 4, 5, and 6, it is appreciated that the lock arms 64, operated by the stop members 48, could begin to move from their unlocked position (FIG. 6) back towards their locked position (FIG. 4) before the lock plate 68 returns to its initial locked position shown in FIG. 4. Should this happen, the lock plate 68 will rotate back to its initial locked position with the lock arm 64 sliding against the curved edge 67 of the lock plate 68 until it can move back into the slot 66.

Having described the locking mechanism 50, the receipt dispenser 80 is now described. As appreciated from the above description, the locking mechanism 50 operates to allow a receipt to be dispensed when a bottle 12 is received, but otherwise prevents the dispensing of a receipt. The receipt dispenser 80 includes an actuator 82 which is operated by the bottle 12 acting thereon, the dispenser shaft 70 which is operated by the actuator 82, and receipt dispensing mechanism 92 which is operated by the dispensing shaft 70 to release a physical receipt though the indicator slot 18 (FIG. 1). The receipt dispenser 80 is now described in more detail.

With reference to FIGS. 3, 4, 5, 6, and 7, the actuator 82 is formed as a dispenser lever 84 positioned at or near the outlet 28 of the chute 24, here the back end of the chute 24, and is engagingly operated by the passing of the bottle 12 from the chute outlet 28 to operate the dispenser shaft 70. The dispenser shaft 70 is supported on the underside of the chute 24 by bracket 86 attached to the bottom of chute walls 30 by screws/bolts 88. The lever 84 includes a hold down bar 84*a,* a first lever arm section 84*b* and a second lever arm section 84*c* which is attached to the dispenser shaft 70 for movement therewith. It is preferable to provide a wide hold down bar 84*a* as shown to prevent the lever 84 from moving into the recess of the handle area of many types of bottles 12. A rounded end 84*d* of second lever arm section 84*c* helps prevent damage to the bottle 12 as it slides over it. A coil spring 90 having one end in contact with a spring stop bar 90*a* and another end connected to the lever arm 84*c* biases the dispenser lever 84 to the position shown in FIGS. 3 and 5. As a bottle 12 passes through the chute outlet 28, the dispenser lever 84 is pushed downward by the bottle 12 to the position shown in FIG. 7, thereby rotating the dispenser shaft 70 to operate the receipt dispenser 80. The hold down bar 84*a* is held down by the bottle 12 until the bottle passes, after which the dispenser lever 84 returns to its initial position shown in FIG. 3 by the spring 90. It is appreciated that the lever 84 cannot be pushed to the receipt dispensing position of FIG. 7 unless permitted to do so by the lock mechanism 50, i.e., the lock bars 51 have been rotated by a bottle 12 in the chute 24 to the unlocked positioned. Thus, without a bottle 12 pushing the stop members 48 to unlock the dispenser shaft 70, a person could not reach into the chute 24 and operate the dispenser lever 84 since it is held locked by the lock arm 64 in lock plate slot 66. The two stop members 48 and lever 84 constitute three separate items in this embodiment that must be operated at the proper time to obtain a receipt.

Figure 9:
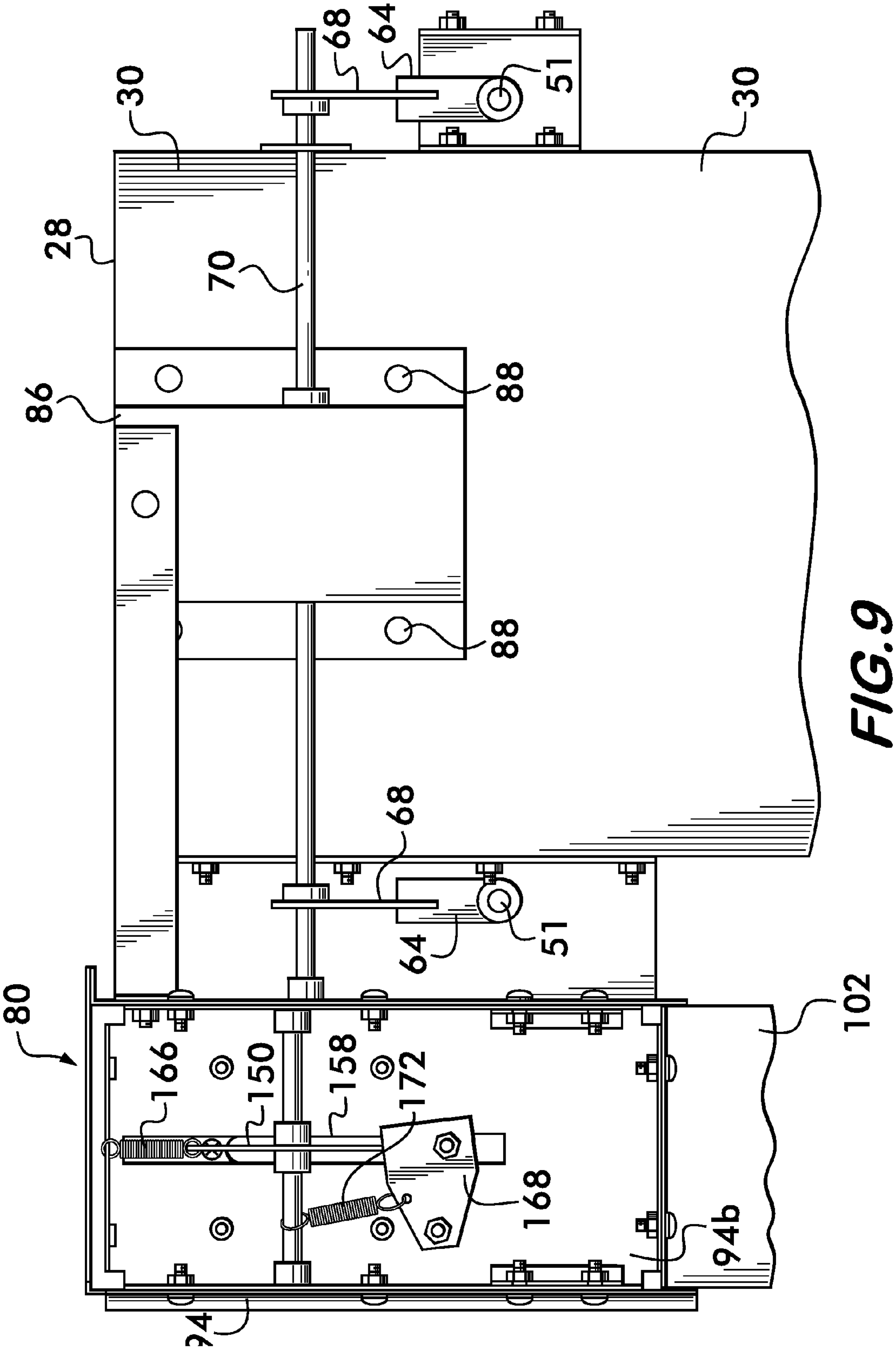
FIG. 9 is a bottom plan view of the present invention showing the underside of the chute and receipt dispenser of the present invention.
Figure 10:
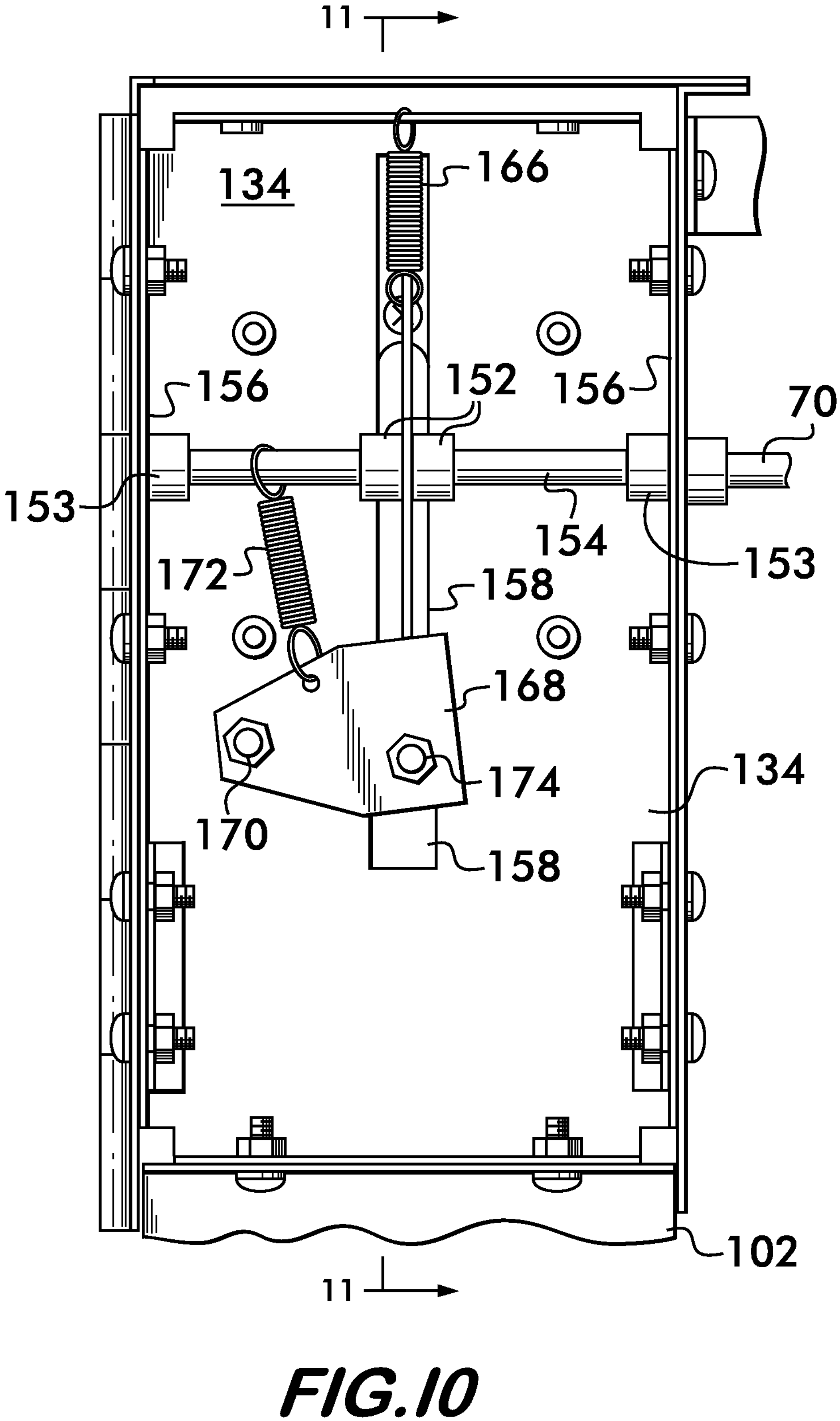
FIG. 10 is an enlarged bottom plan view of the dispenser mechanism of the present invention.
Figure 11:
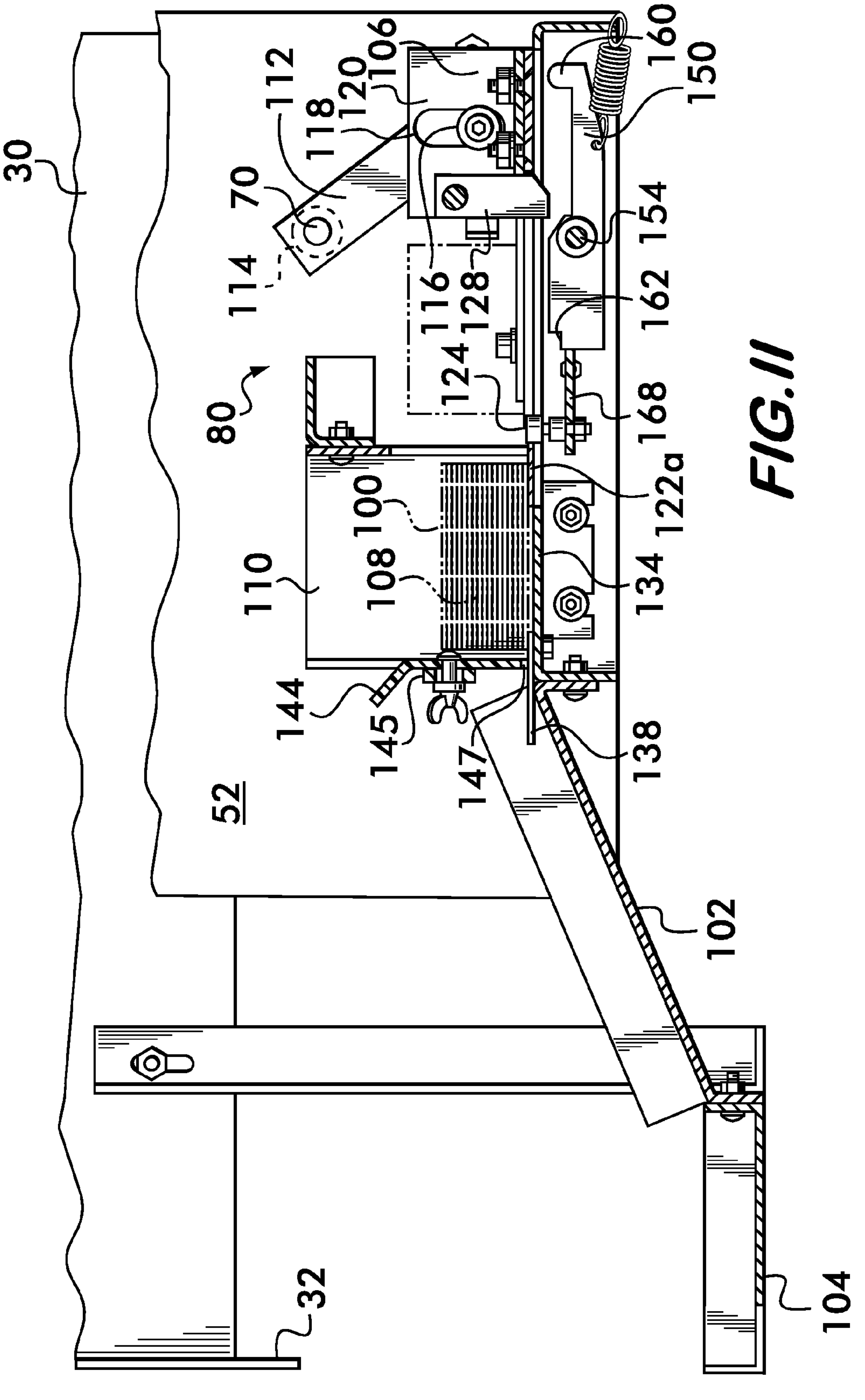
FIG. 11 is a cross sectional view taken along line 11-11 of FIG. 10 showing the slideable card pusher in an unlocked position.

The rotation of the dispenser shaft 70 operates the card dispenser 80 as further described below. As seen in FIGS. 3 and 5, the dispenser shaft 70 extends through the bracket 52*a* to the dispenser mechanism 92 housed in housing 94 which is shown closed in FIG. 3 (preferably locked to prevent tampering) and opened in FIG. 5. FIG. 9 shows a bottom view of the dispenser 80 and housing 94 relative to the chute 24. The housing 94 is formed of the side and top housing cover 94*a* shown opened about a hinge 96, bracket 52*a* forming a side of the housing 94, and bottom section 94*b*. With further reference to FIG. 11, the dispenser mechanism 92 issues receipt cards 100 that slide down a slide chute 102 into a holding tray 104. The holding tray 104 is accessed by the user through indicator opening 18 in the access panel 20 as shown in FIG. 1. Thus, with each bottle 12 that is pushed through and exits the chute 24, a receipt card 100 is issued. Thus, it is seen that the actuator, via shaft 70, physically drives the dispenser 80 to issue a receipt 100 without use of electrical devices and motors as used in prior art devices.

Figure 8:
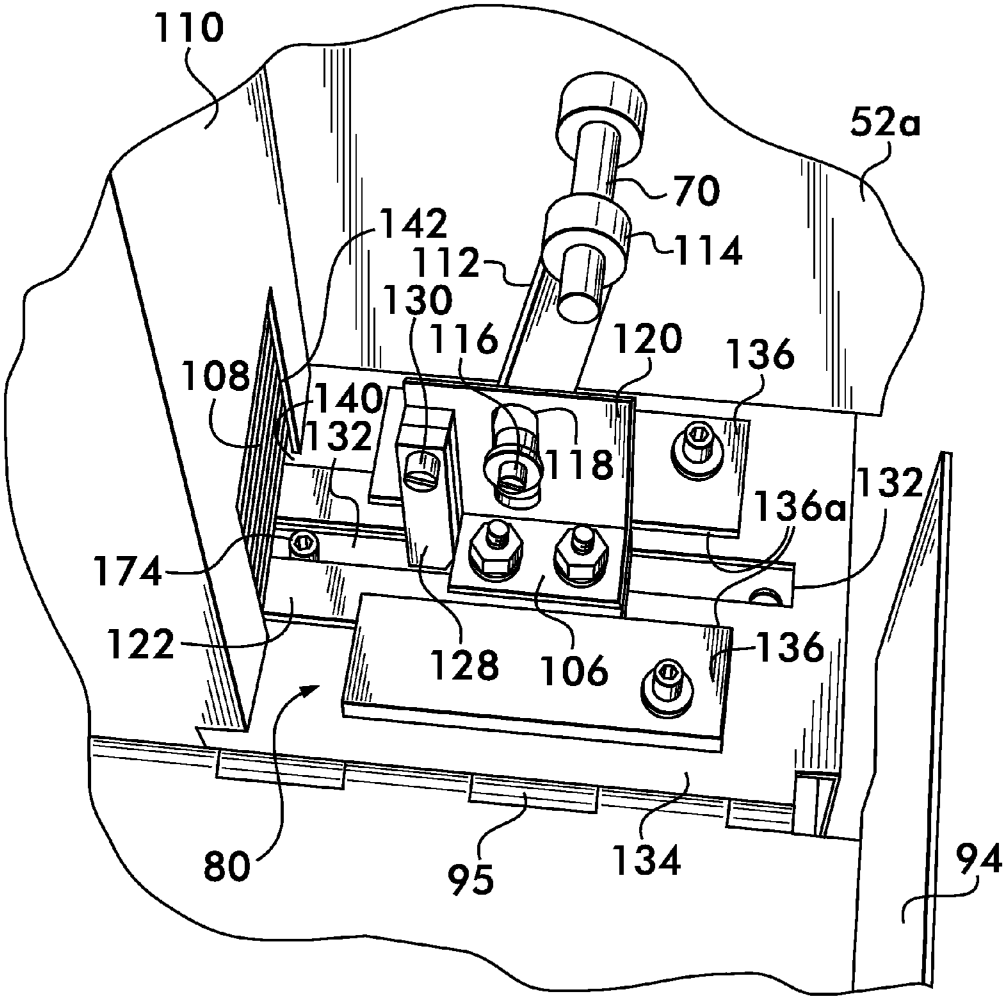
FIG. 8 is a top view of the receipt dispenser showing the dispenser cover opened and the slidable card pusher within.
Figure 14:
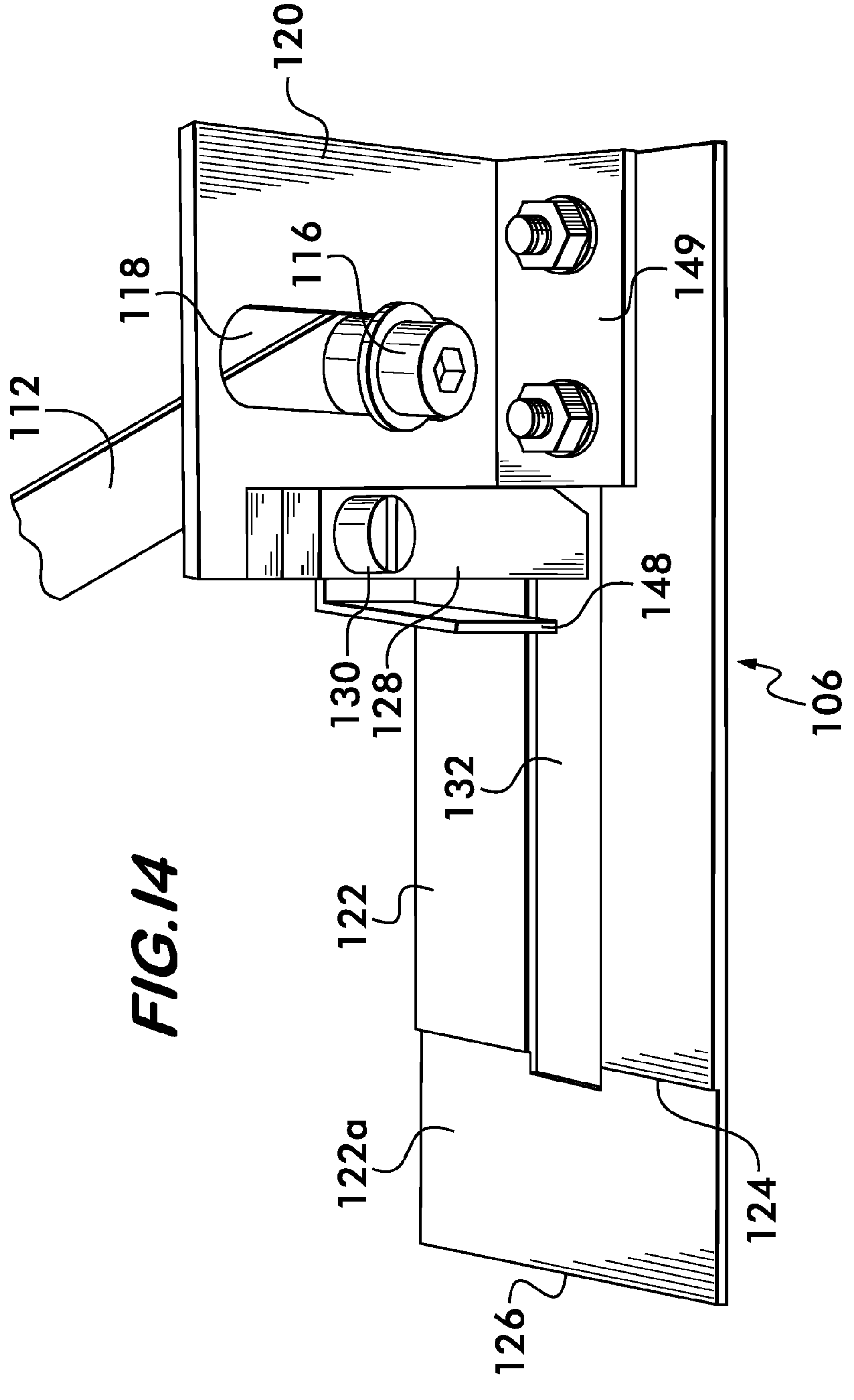
FIG. 14 is an enlarged isolated view of the card pusher plate.

With reference to FIGS. 8 and 14, the dispenser unit 92 includes a slidable card pusher 106 that pushes individual receipt cards 100 from card stack 108 (stack of cards 100), held in card holder 110, down the slide chute 102 into the receipt holder 104 (FIG. 11). With particular reference to FIGS. 8 and 14, slidable card pusher 106 is attached to the dispenser shaft 70 by crank 112 for movement therewith, the crank 112 being attached to the shaft 70 by collar 114 and to the pusher 106 by pin 116 slidable in elongate plate slot 118 (FIG. 14) as the pivotal motion of the shaft 70 is translated to linear motion to move the pusher 106 back and forth. With particular reference to FIG. 14, the pusher 106 includes a bracket section 120 which includes the slot 118, a slide plate 122 having a front section 122*a*, a shoulder 124 raised above and separating the front section 122*a* from the thicker remainder of the slide plate 122, a front end 126, and a pivot arm 128 which freely pivots about pin 130 within slot 132 and which extends below the plate 122.

Figure 12:
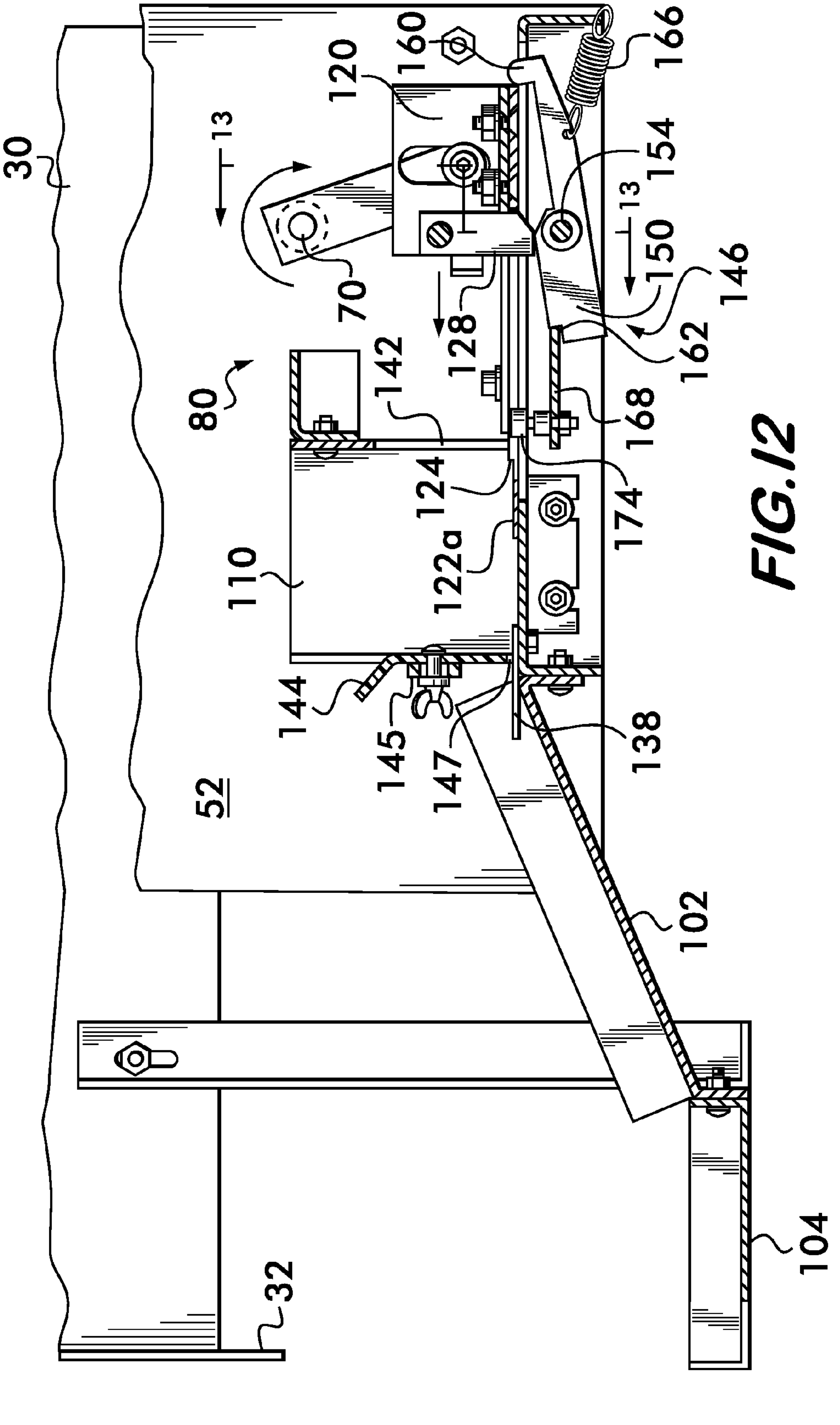
FIG. 12 is a similar view as that of FIG. 11 but showing the slidable card pusher in a locked position.
Figure 13:
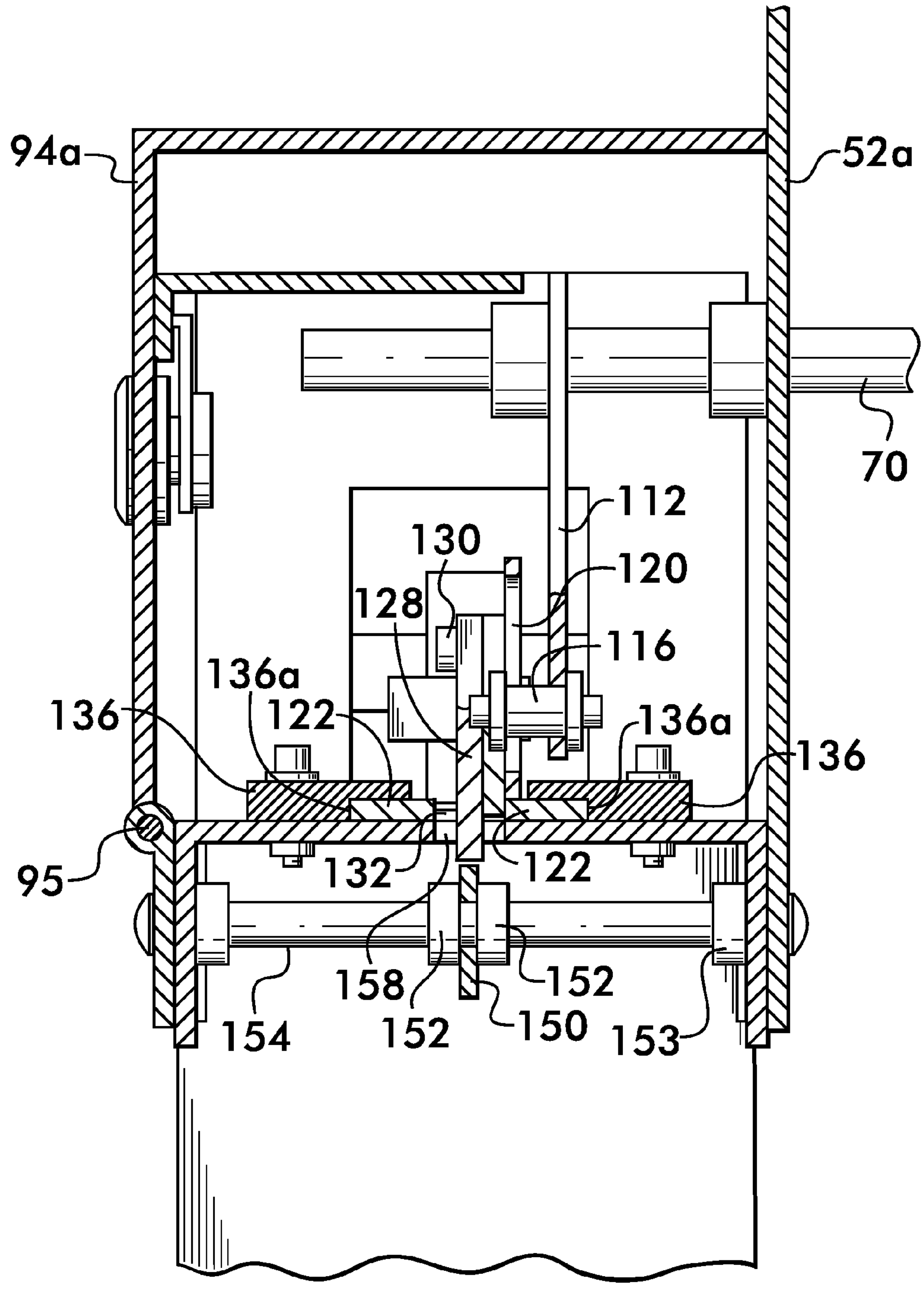
FIG. 13 is a cross sectional view taken along line 13-13 of FIG. 12.

With particular reference to FIGS. 8, 11, 12, 13 and 14, the card pusher 106 slides back and forth over dispenser bottom plate 134 in between two guide plates 136 bolted to the bottom plate 134, and over slot 158 in the bottom plate 134. The guide plates 136 include longitudinal edge slots 136*a* or recesses along their inner edges that form channels with the bottom plate 134 within which the slide plate 122 of pusher 106 slides back and forth. With further reference to FIGS. 8, 11, 12, and 17, the cards 100 of card stack 108 are supported above the housing bottom plate 134 on two support plates 138, on the left side in FIG. 11, and by the front section 122*a* of the slidable card pusher 106. It is seen that the support plates 138 form slot 140 therebetween into which slides the front section 122*a* of card pusher 106. To push a card 100 out from the card stack 108, the pusher 106 moves leftward as seen in FIGS. 11 and 12, the slide pate 122 moving through the opening 142 in the card holder 110 into the slot 140 formed under the card stack 108 between the support plates 138. As the front section 122*a* of the slide pusher plate 106 (FIG. 14) moves, the shoulder 124 engages and pushes the bottom most card 100 out from the card stack 108 onto the slide tray 102 which is sloped to deliver the card 100 to the card holder 104. Plastic retainer panel 144 (FIGS. 11, 12 and 17) mounted on cross bar 145 by a thumb screw can be adjusted to set the height of gap 147 above the support plates 138 to allow only the bottom most card 100 to be pushed out from the stack 108. In the present embodiment, the support plates 138 are shown extended over the slide chute 102. This keeps the card 100 flat while being pushed over the chute 102, and prevents the card from riding up over the shoulder 124 when being pushed as may happen as a portion of the card moves over the chute 102 without such support.

The card dispenser unit 80 includes a further lock mechanism 146 to prevent someone from attempting to jiggle or move the bottle 12 back and forth within the chute 24 just enough to obtain multiple cards with the same bottle 12 in the chute 24. This is separate from the lock mechanism 50 that prevents the dispenser unit 80 from working without a bottle 12 being passed through the chute, since this stops multiple cards from being dispensed once the dispenser unit 80 is unlocked. A preferred embodiment is now described with reference to the figures. As discussed above, a card 100 is dispensed from the card stack 108 by the shoulder 124 of the pusher 106. The lock mechanism 146 prevents the return of the shoulder 124 to a position where it can push out another card until the bottle 12 has traveled through and exited the chute where the user can no longer manipulate the bottle 12.

With reference to FIGS. 9, 10, 11, 12, 15 and 16, the lock mechanism 146 is provided on the underside of the bottom plate 134 beneath the card pusher 106. In the illustrated embodiment, this lock mechanism includes a lock plate 150 held in place by collars 152 on a pivot bar 154 connected for rotation to the housing side walls 156 and about which the lock plate 150 can pivot. Collars 153 hold the pivot bar 154 in place. The lock plate 150 is aligned with slot 158 formed in the bottom plate 134 which also aligns with the slot 132 of the card pusher 106. The lock plate 150 has at one end a stop tab 160 and on the other end an edge slot 162 and an engagement surface 164 which slidably engages the card pusher 106 as the pusher moves over it. A coil spring 166 attached to the lock plate 150 at the stop tab end biases the lock plate 150 so that the stop tab 160 is below the bottom of the slide card pusher 106 and the engagement surface 164 extends to its upper most position beneath the slot 158 so as to be engageable by the card pusher plate 106. As further described below, the lock plate 150 is configured such that when the engagement surface 164 is pushed downward by the pivot arm 128 of the pusher 106, the lock plate 150 pivots about the pivot bar 154 so that the stop tab 160 extends upward through the slot 158 to prevent movement of the card pusher plate 106 back to its starting position. A release plate 168 pivots about bolt 170 via spring 172 so as to be biased to move towards the edge of the lock plate 150 that has the edge slot 162 formed therein, and also includes an arm 174 (here formed as a bolt) aligned with the slot 158 and which extends above the release plate 168 (towards the bottom plate 134) in the slot 158 for contact with the pivot arm 128 of the pusher 106 as discussed below.

Figure 15:
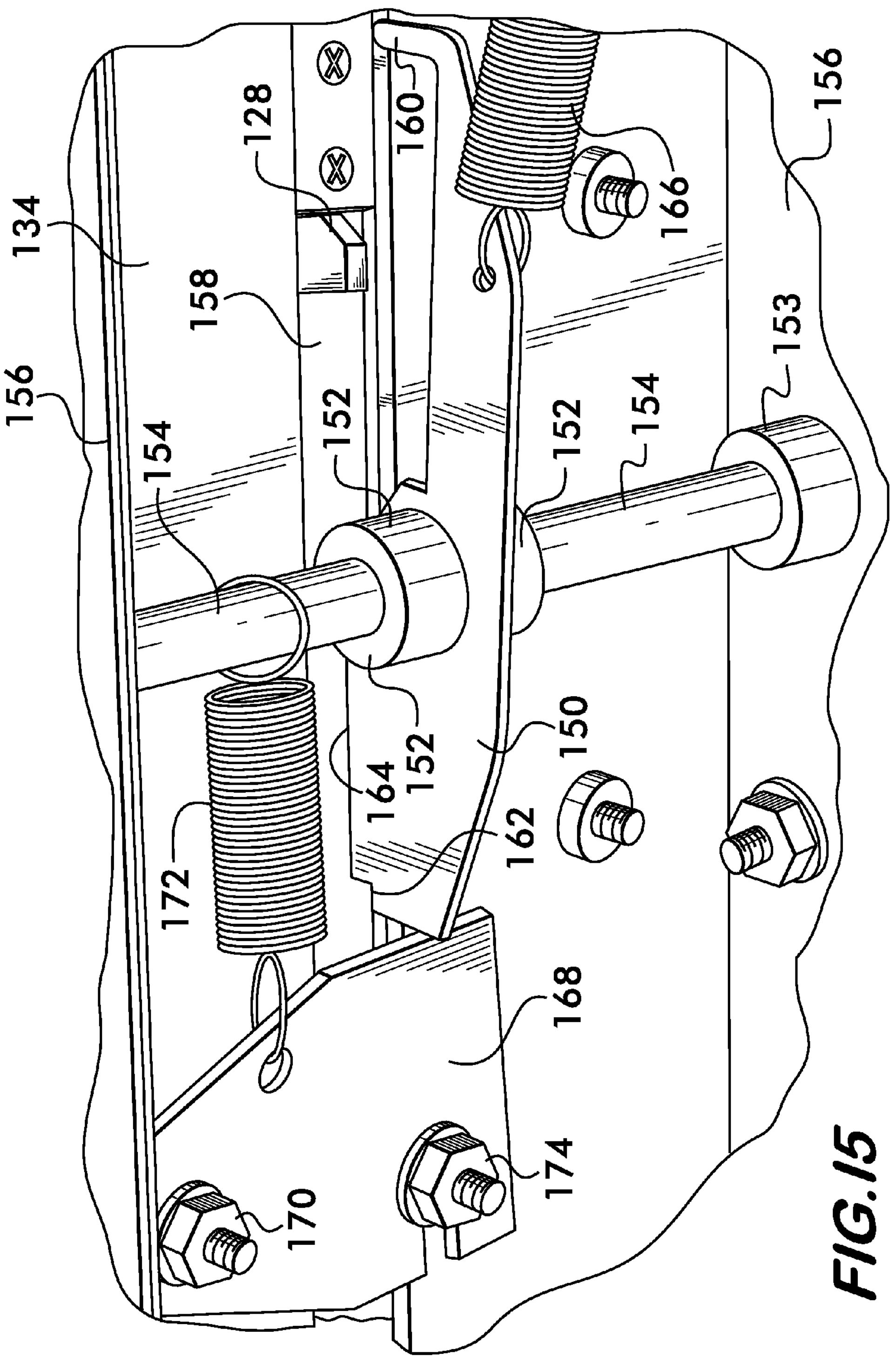
FIG. 15 is a bottom side view of the receipt dispenser showing the dispenser lock mechanism in the unlocked position.

The operation of the lock mechanism is now described with initial reference to FIGS. 8, 9, 15 and 11. FIGS. 15 and 11 illustrate the position of the various elements prior to movement of the bottle 12 through the chute 24. The card pusher 106 is in its initial or first position, to the right as seen in FIG. 11. Here, the shoulder 124 of the pusher 106 has not engaged a receipt card 100, and the engagement surface 164 of the lock plate 150 is in its upper most position via the bias of the spring 166, and the lock tab 160 is in its lower most position.

Figure 16:
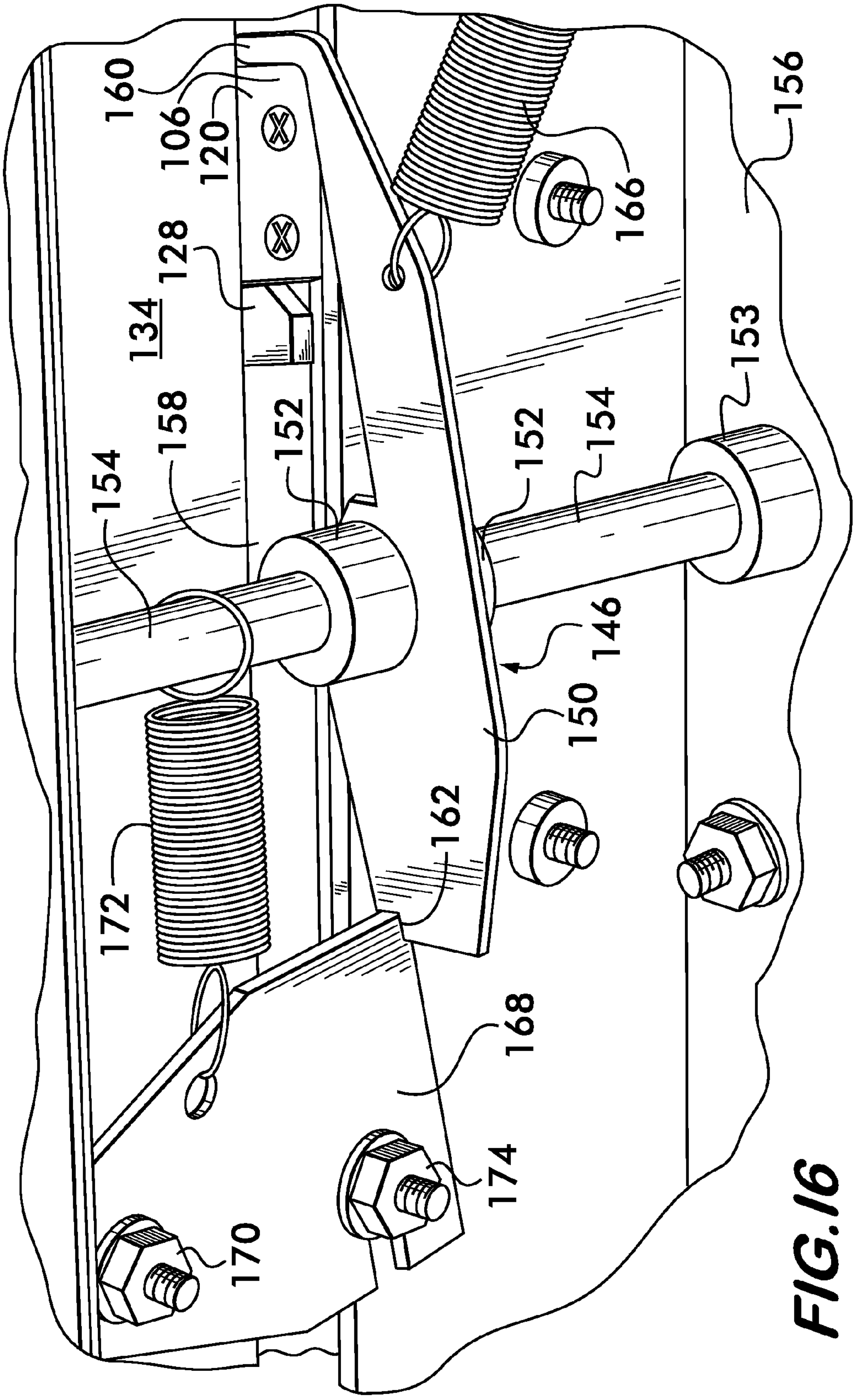
FIG. 16 is a bottom side view of the receipt dispenser showing the dispenser lock mechanism in the locked position.
Figure 17:
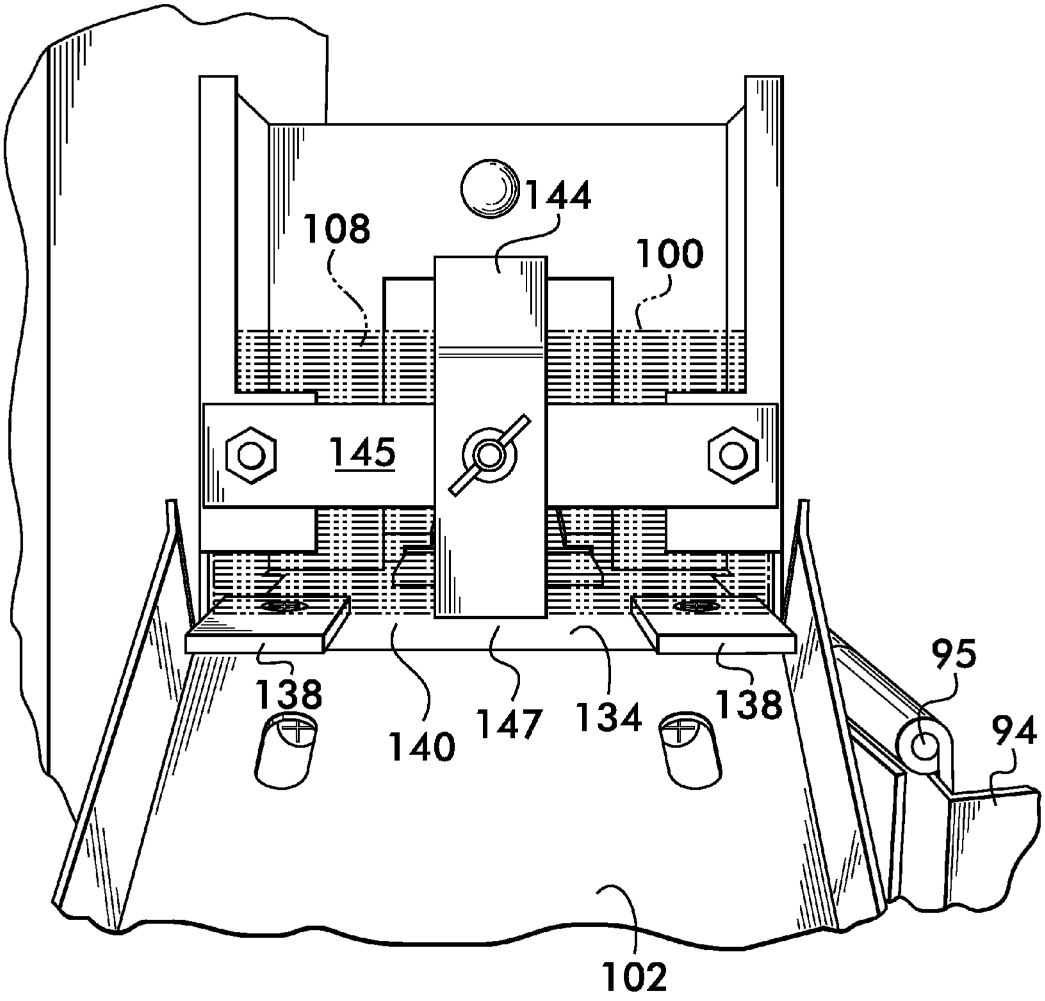
FIG. 17 is a front view of the present invention showing the bottom portion of the stack of cards.

With further reference to FIG. 12, as a bottle 12 is moved through the chute 24, stop members 48 engage the bottle and move outwardly, which in turn rotates the lock bars 51, which in turn rotate the lock arms 64 to allow movement of the dispenser shaft 70. As the bottle 12 reaches the rear of the chute 24, with the lock arms 64 still rotated by the bottle 12, the lever 84 depressed by the bottle 12 to rotate the dispensing shaft 70, which in turn pivots the crank 112 to the left in FIGS. 11 and 8, which in turn moves the pusher member 106 to the left. As the pusher member 106 moves to the left, the pivot arm 128 of the pusher member 106 engages the engagement edge 164 of the lock plate 150 and pushes it downward, raising lock tab 160 out of the slot 158 a sufficient height to stop backward movement of the pusher member 106 beyond it. As best seen in FIG. 16, as the lock plate 150 pivots about pivot bar 154 the release plate 168 is urged into the edge slot 162 by spring 172 to hold the lock plate 150 in position with the lock tab 160 extended above the bottom plate 134 and thereby stop backward movement of the pusher member 106 (FIG. 16). At this point the shoulder 124 of pusher member 106 has begun to push a card 100. Should the user try to move the bottle 12 in the chute 24 backwards at this time, even if some bottle movement were possible while the bottle was being gripped by the stop members 48, the lock tab 160 would prevent movement of the pusher 106 back to its initial or starting position where the shoulder 124 could engage another card 100.

As the bottle 12 is pushed out the chute outlet 28, the dispensing lever 84 (FIG. 7) is depressed to its lowest position, thereby pivoting the dispensing shaft 70, which in turn moves the pusher 106 to its left most position as shown in FIG. 12 for pushing out a card 100. At this position, the pivot arm 128, held from pivoting rightward by bracket 149 of pusher member 106 (FIG. 14), engages the top side of the arm 174 of the release plate 168 to push the release plate 168 to the left (FIG. 16) which causes the lock plate 150 to move back to its initial position via spring 166 where the lock tab 160 is below the opening 158, thereby allowing the pusher member 106 to return to its initial position as shown in FIG. 15. As seen in FIG. 14, an angled bracket 148 prevents the pivot arm 128 from swinging over the arm 174. With the exit of the bottle 12 from the chute 24, the spring 90 (FIG. 7) returns the lever 84 to its initial position as shown in FIG. 3, which in turn pivots the dispenser shaft 70 back to its initial position, which in turn moves the pusher 106 back to its initial position as shown in FIG. 11, ready to dispense a new receipt card 100 with the next bottle 12. The device of the present invention is now in a position to dispense a receipt 100 for the next bottle 12. The receipt used in this embodiment is a plastic card about the size of a credit card, although any suitable receipt can be used.

Having described a preferred embodiment, it is seen that the device carries out a preferred method of receiving and detecting any suitable article 12, such as the bottle described above. In summary, this method includes providing a chute 12 having an inlet 26 through which the article 12 is received and an outlet 28 through which the article exits into the cage 14. In the preferred embodiment, the stop member 48 also acts as a detection member to detect the article within the chute 24. Movement of the article in the chute 12 moves the detection member 48. A receipt dispensing step is carried out by the article 12 passing through the outlet 28 to operate the actuator 82 by depressing the lever 84, which in turn operates the dispensing unit to issue a receipt 100. The dispensing of a receipt, however, is not carried out if the article 12 was not detected in the chute; the lock mechanism 50 prevents the actuator 82 from operating the dispenser unit. As discussed above, the lock mechanism 50 is operatively connected to the detection member 48 for movement therewith via finger 58 such that movement of the detection member 48 thereby moves the lock mechanism's lock bar 51 which in turn moves to a position to allow movement of the dispenser shaft 70 by the actuator to operate the dispenser unit 92 to dispense a receipt. If an article is not detected in the chute, i.e., the detection member 48 is not moved, then the lock bar 51 is not moved, thereby remaining in a position to prevent the operation of the dispensing unit 92 by preventing movement of the dispenser shaft 70. Methods are also provided for preventing the dispensing of more than one card for a given article, such as that carried out by the lock mechanism 146 described above. The term "operatively connected" as used herein refers to a mechanical connection of some kind such that movement of one member causes movement of another, e.g., to allow one member to operate the other.

It is appreciated that described above is a novel apparatus and method. It is also understood that this invention is not limited to bottles, but can be used with any suitable article, although changes and modifications to the configuration of the device may be required for the particular article. It is also understood that the invention is not limited to the embodiments and illustrations described above, and includes the full scope provided by the claims appended hereto.

The invention claimed is:

1. An apparatus for receiving and detecting a bottle, comprising:

a chute configured for receiving the bottle therein, said chute having an inlet for receiving the bottle and an outlet through which the bottle exits said chute;

a bottle stop having a first stop member disposed within said chute and biased towards said bottle to allow said first stop member to slidingly engage said bottle moving through said chute, said first stop member configured to be urged by said bottle in a direction away from said bottle as said bottle moves from said inlet to said outlet thereby allowing said bottle to pass by said first stop member, and said first stop member being moveable by said bottle in accordance with said bias in a direction towards said bottle as said bottle moves in a direction from said outlet to said inlet to more forcibly engage and thereby inhibit movement of said bottle towards said inlet;

a receipt dispenser mounted on said apparatus for issuing a physical receipt indicating that a bottle has been received by the apparatus, said receipt dispenser having an actuator disposed for engagement with said bottle passing through said chute so as to be moved thereby and also having a receipt unit from which said receipt issues, said dispenser unit operatively connected to said actuator to be driven thereby such that movement of said actuator by said bottle causes the dispensing of a receipt;

a lock mechanism mounted on said apparatus and positioned to be operable by movement of the bottle in said chute so as to physically detect the presence of a bottle therein, said lock mechanism being operatively connected to said receipt dispenser and movable by said bottle from a locked position preventing dispensing of a receipt when the bottle is not detected in said chute to an unlocked position allowing the dispensing of a receipt when the bottle is detected within said chute; and a second stop member disposed within said chute, said first and second stop members being positioned to engage substantially opposite sides of said bottle within said chute thereby cooperating with one another to inhibit movement of said bottle in the direction from said outlet towards said inlet.

2. The apparatus of claim 1 wherein said lock mechanism is operatively connected to said first stop member for movement therewith, said lock mechanism being moved by movement of said first stop member to said unlock position when said first stop member is in engagement with said bottle, said lock mechanism being biased for movement towards the locked position when said first stop member is not in engagement with said bottle.

3. The apparatus of claim 1 wherein said receipt dispenser further comprises a dispenser shaft connecting said actuator to said dispenser unit for operating said dispenser unit, and said actuator comprises a lever disposed at or near the outlet of said chute to be engaged and moved by the bottle passing thereby, said lever being operatively connected to said dispenser shaft for rotation therewith.

4. The apparatus of claim 1 wherein said first stop member is pivotally attached to a chute wall and extends towards an internal portion of said chute in which said bottle moves, said first stop member configured to move away from said bottle when said bottle engages said first stop member moving in the direction from said inlet towards said outlet, and said first stop member configured to move towards said bottle when said bottle engages said first stop member when moving in the direction from said outlet towards said inlet.

5. The apparatus of claim 1 wherein said chute is rectangular shaped.

6. The apparatus of claim 3 wherein said lock mechanism comprises a lock bar operatively connected to said first stop member for pivotal movement therewith between its locked and unlocked positions, said lock bar engaging said dispenser shaft so as to prevent rotation of said dispenser shaft when in said lock position.

7. The apparatus of claim 6 wherein said lock mechanism includes a lever attached to said lock bar for movement therewith, said lever engaging said dispensing shaft to prevent movement of said shaft when in the lock position.

8. An apparatus in accordance with claim 3 wherein said dispenser further comprises a card pusher slidable to push said receipt from said dispenser, said dispenser further comprising a lock mechanism to prevent multiple receipts from being issued, said dispenser lock mechanism comprising a lock bar having a locking tab mounted for pivotal movement between a lock position whereby said tab interferes with movement of said pusher to an unlock position whereby said tab does not interfere with movement of said pusher, said pusher being operatively connected to said dispenser shaft to be driven thereby.

9. An apparatus for receiving and detecting a bottle, comprising:

- a chute configured for receiving the bottle therein, said chute having an inlet for receiving the bottle and an outlet through which the bottle exits said chute;
- a bottle stop having a stop member disposed within said chute and biased towards said bottle to allow said stop member to slidingly engage said bottle moving through said chute, said stop member configured to be urged by said bottle in a direction away from said bottle as said bottle moves from said inlet to said outlet thereby allowing said bottle to pass by said stop member, and said stop member being moveable by said bottle in accordance with said bias in a direction towards said bottle as said bottle moves in a direction from said outlet to said inlet to more forcibly engage and thereby inhibit movement of said bottle towards said inlet;
- a receipt dispenser mounted on said apparatus for issuing a physical receipt indicating that a bottle has been received by the apparatus, said receipt dispenser having an actuator disposed for engagement with said bottle passing through said chute so as to be moved thereby and also having a receipt unit from which said receipt issues, said dispenser unit operatively connected to said actuator to be driven thereby such that movement of said actuator by said bottle causes the dispensing of a receipt;
- a lock mechanism mounted on said apparatus and positioned to be operable by movement of the bottle in said chute so as to physically detect the presence of a bottle therein, said lock mechanism being operatively connected to said receipt dispenser and movable by said bottle from a locked position preventing dispensing of a receipt when the bottle is not detected in said chute to an unlocked position allowing the dispensing of a receipt when the bottle is detected within said chute; and
- said dispenser further comprising a pusher member slidable to push said receipt from said dispenser, said pusher being connected to said dispenser shaft via a crank so as to be slidable back and forth in response to pivotal movement of said dispenser shaft.

10. An apparatus for receiving and detecting an article, comprising:

- a chute configured for receiving the article therein, said chute having an inlet for receiving said article, an outlet through which the article exits said chute, and a chute wall between said inlet and said outlet;
- at least one stop having a stop member disposed within said chute and biased away from a chute wall and towards said article so as to slidably engage said article moving through said chute in a direction from said inlet towards said outlet, said stop member being pivotally mounted so as to be moveable against said bias in a direction away from said article towards said chute wall when said article engages said stop member as said article moves in a direction from said inlet to said outlet, and is moveable in a direction in accordance with said bias away from said chute wall into said article as said article engages said stop member as said article moves in a direction from said outlet to said inlet to thereby inhibit movement of said article;
- a receipt dispenser mounted on said apparatus for issuing a physical receipt indicating that the article has been received by the apparatus, said receipt dispenser having a dispenser unit that holds receipts to be dispensed, a lever disposed for engagement with said article passing through said chute, and a dispenser shaft connected to said lever for movement therewith, said dispenser shaft being further connected to said dispenser unit such that movement of said dispenser shaft operates said dispensing unit to issue a receipt;
- a lock mechanism mounted on said apparatus, said lock mechanism having a bar operatively connected to said stop member for movement therewith and positioned to engage said dispenser shaft so as to prevent movement thereof, said lock mechanism being moveable between a locked position engaging said dispenser shaft and an unlocked position allowing movement of said dispenser shaft; and
- said dispenser further comprising a card pusher slidable to push said receipt from said dispenser, said dispenser further comprising a lock mechanism to prevent multiple receipts from being issued for one article, said lock mechanism comprising a lock bar having a locking tab mounted for pivotal movement between a lock position whereby said tab interferes with movement of said pusher to an unlock position whereby said tab does not interfere with movement of said pusher, said pusher being operatively connected to said dispenser shaft for movement therewith.

11. The apparatus of claim 10 wherein said bar comprises a shaft mounted for pivotal movement in response to pivotal movement of said stop member, said bar further comprising a lever pivotal with said shaft and which is positioned to engage said dispenser shaft when in the locked position.

12. An apparatus for receiving and detecting an article, comprising:

a chute configured for receiving the article therein, said chute having an inlet for receiving said article, an outlet through which the article exits said chute, and a chute wall between said inlet and said outlet;

at least one stop having a stop member disposed within said chute and biased away from a chute wall and towards said article so as to slidably engage said article moving through said chute in a direction from said inlet towards said outlet, said stop member being pivotally mounted so as to be moveable against said bias in a direction away from said article towards said chute wall when said article engages said stop member as said article moves in a direction from said inlet to said outlet, and is moveable in a direction in accordance with said bias away from said chute wall into said article when said article engages said stop member as said article moves in a direction from said outlet to said inlet to thereby inhibit movement of said article;

a receipt dispenser mounted on said apparatus for issuing a physical receipt indicating that the article has been received by the apparatus, said receipt dispenser having a dispenser unit that holds receipts to be dispensed, a lever disposed for engagement with said article passing through said chute, and a dispenser shaft connected to said lever for movement therewith, said dispenser shaft being further connected to said dispenser unit such that movement of said dispenser shaft operates said dispensing unit to issue a receipt;

a lock mechanism mounted on said apparatus, said lock mechanism having a bar operatively connected to said stop member for movement therewith and positioned to engage said dispenser shaft so as to prevent movement thereof, said lock mechanism being moveable between a locked position engaging said dispenser shaft and an unlocked position allowing movement of said dispenser shaft; and said dispenser further comprising a card pusher slidable to push said receipt from said dispenser, said card pusher being connected to said dispenser shaft via a crank so as to be slidable back and forth in response to pivotal movement of said dispenser shaft.

* * * * *